(12) United States Patent
Winter

(10) Patent No.: US 10,965,873 B1
(45) Date of Patent: Mar. 30, 2021

(54) SYSTEMS AND METHODS FOR UPDATING CAMERA DISPLAYS

(71) Applicant: Facebook, Inc., Menlo Park, CA (US)

(72) Inventor: Howard William Winter, Romsey (GB)

(73) Assignee: Facebook, Inc., Menlo Park, CA (US)

( * ) Notice: Subject to any disclaimer, the term of this patent is extended or adjusted under 35 U.S.C. 154(b) by 61 days.

(21) Appl. No.: 16/139,532

(22) Filed: Sep. 24, 2018

(51) Int. Cl.
*H04N 5/232* (2006.01)
*G06T 7/80* (2017.01)
*H04N 5/225* (2006.01)

(52) U.S. Cl.
CPC ......... *H04N 5/232935* (2018.08); *G06T 7/80* (2017.01); *H04N 5/2259* (2013.01); *H04N 5/23216* (2013.01); *H04N 5/23222* (2013.01); *H04N 5/23296* (2013.01); *H04N 5/23299* (2018.08)

(58) Field of Classification Search
CPC ......... H04N 5/232935; H04N 5/23222; H04N 5/23216; H04N 5/2259; H04N 5/23299; H04N 5/23296; H04N 5/225; H04N 5/232; H04N 5/23203; H04N 5/23206; H04N 5/23209; H04N 5/23225; H04N 5/23245; H04N 2101/00; H04N 5/772; G06T 7/80
See application file for complete search history.

(56) References Cited

U.S. PATENT DOCUMENTS

| | | | | |
|---|---|---|---|---|
| 9,118,832 | B2 * | 8/2015 | Parviainen | H04N 5/232945 |
| 2004/0201677 | A1 * | 10/2004 | Bronson | G08B 13/19689 |
| | | | | 348/207.1 |
| 2006/0290804 | A1 * | 12/2006 | Mino | H04N 1/2137 |
| | | | | 348/348 |
| 2009/0015658 | A1 * | 1/2009 | Enstad | H04N 7/15 |
| | | | | 348/14.08 |
| 2010/0097488 | A1 * | 4/2010 | Suzuki | G09G 5/00 |
| | | | | 348/222.1 |
| 2010/0149378 | A1 * | 6/2010 | Suzuki | H04N 5/232 |
| | | | | 348/231.99 |
| 2010/0238262 | A1 * | 9/2010 | Kurtz | H04N 7/142 |
| | | | | 348/14.01 |
| 2010/0245532 | A1 * | 9/2010 | Kurtz | G06K 9/00711 |
| | | | | 348/14.03 |
| 2011/0273579 | A1 * | 11/2011 | Sakaki | H04N 7/181 |
| | | | | 348/222.1 |

(Continued)

*Primary Examiner* — Abdelaaziz Tissire
(74) *Attorney, Agent, or Firm* — FisherBroyles, LLP

(57) ABSTRACT

The disclosed computer-implemented method may include (i) receiving, by a camera system that includes at least one camera, input from a user instructing the camera system to adjust a framing of the camera, (ii) directing, by the camera system, the camera to adjust the framing, (iii) determining a predicted modified camera frame that approximates an actual modified camera frame predicted to result from directing the camera to adjust the framing, (iv) displaying, before completely receiving visual data that results from the actual modified camera frame from the camera, the predicted modified camera frame to the user, (v) receiving the visual data including the actual modified camera frame from the camera after the camera adjusts the camera frame, and (vi) displaying the actual modified camera frame to the user. Various other methods, systems, and computer-readable media are also disclosed.

19 Claims, 11 Drawing Sheets

(56) References Cited

U.S. PATENT DOCUMENTS

| | | | |
|---|---|---|---|
| 2012/0005630 A1* | 1/2012 | Ohba | G09G 5/14 |
| | | | 715/853 |
| 2012/0026343 A1* | 2/2012 | Ezoe | H04N 7/183 |
| | | | 348/207.1 |
| 2015/0029357 A1* | 1/2015 | Hamalainen | H04N 5/232 |
| | | | 348/223.1 |
| 2015/0117784 A1* | 4/2015 | Lin | G06K 9/4671 |
| | | | 382/195 |
| 2017/0070670 A1* | 3/2017 | Kwon | H04N 5/23222 |
| 2018/0270441 A1* | 9/2018 | Van Geel | H04N 5/268 |
| 2019/0289198 A1* | 9/2019 | Bosworth | G06F 3/017 |

\* cited by examiner

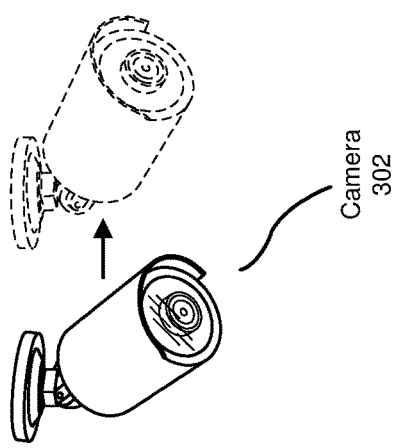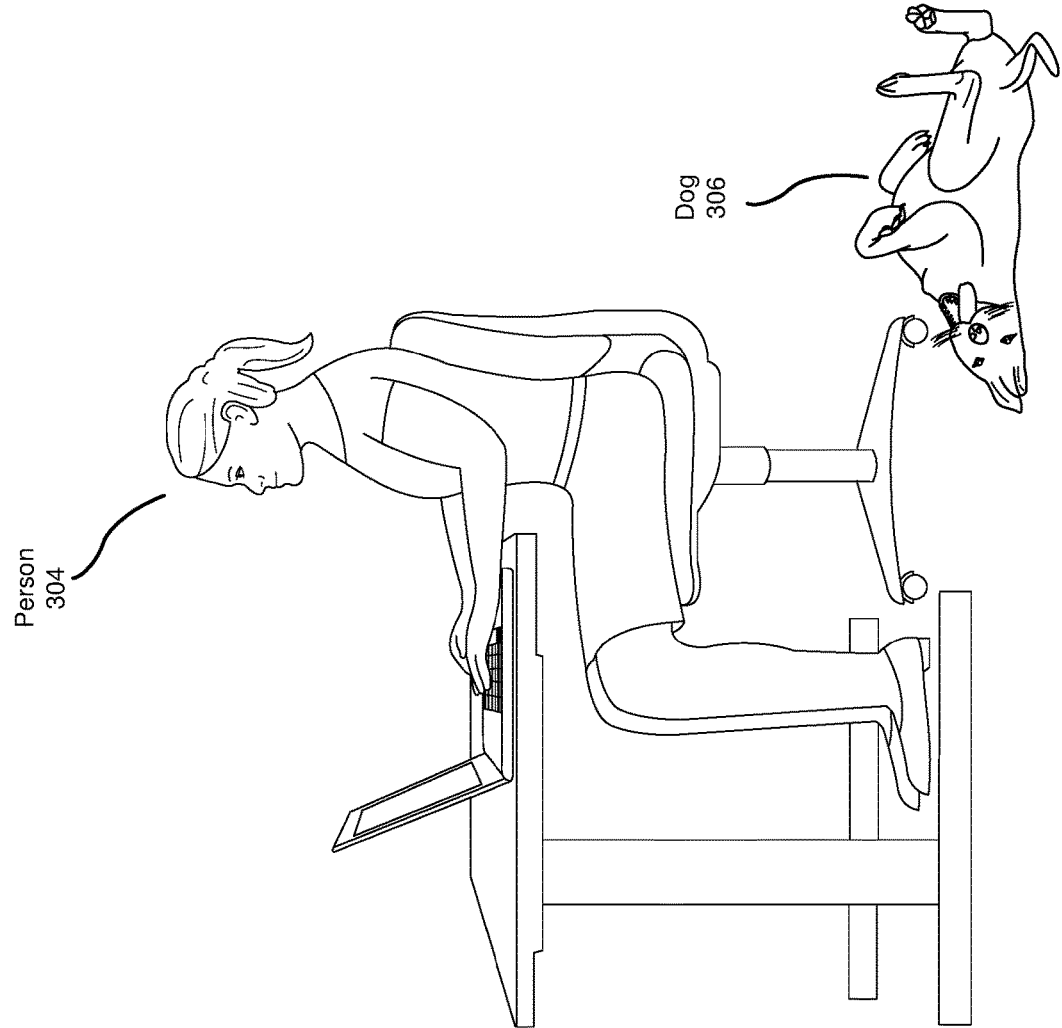
FIG. 3

SYSTEMS AND METHODS FOR UPDATING CAMERA DISPLAYS

BACKGROUND

Videoconferencing is an important function of computing devices for many users. Home users may videoconference with distant friends or relatives, while users at work may videoconference with colleagues scattered in different offices around the globe. For some users, videoconferencing may entirely replace coming in to a physical office to work. For a videoconferencing system to provide a high-quality user experience, the videoconferencing system must be responsive to user input to adjust conference attributes such as volume, display, and camera frames.

In traditional videoconferencing systems, a user may be able to direct the videoconferencing system to adjust a remote camera so that the user can better view a person, group of people, or environment on the other end of the videoconference. However, in some traditional videoconferencing systems, connection latency and/or physical camera features may introduce a lag between when a user directs the videoconferencing system to adjust the camera position and when the user's display is updated to show the new camera framing/composition. This display lag may be frustrating to users who may over-correct or under-correct for the desired camera framing due to the lack of immediate visual feedback. The instant disclosure, therefore, identifies and addresses a need for systems and methods for updating camera displays.

SUMMARY

As will be described in greater detail below, the instant disclosure describes systems and methods for updating camera displays by displaying a predicted modified camera frame image before receiving data that results from the actual modified camera framing.

In one example, a computer-implemented method for updating camera displays may include (i) receiving, by a camera system that includes at least one camera, input from a user instructing the camera system to adjust framing of the camera, (ii) directing, by the camera system, the camera to adjust the camera framing in accordance with the input from the user, (iii) determining a predicted modified camera frame that approximates an actual modified camera frame predicted to result from directing the camera to adjust the camera framing in accordance with the input from the user, (iv) displaying, before completely receiving visual data that results from the actual modified camera framing from the camera, the predicted modified camera frame to the user, (v) receiving the visual data including the actual modified camera frame from the camera after the camera adjusts the camera framing in accordance with the input from the user, and (vi) displaying the actual modified camera framing to the user.

In one embodiment, receiving the input from the user may include receiving the input from the user via a computing device that displays visual data received from the camera to the user and directing the camera to adjust the camera framing includes sending, from the computing device, a message to an additional computing device that includes the camera and that is located remotely from the computing device. In some embodiments, the visual data may include video data. In one embodiment, the camera system may include a videoconferencing system.

In some examples, determining the predicted modified camera frame may include determining the predicted modified camera frame based at least in part on a physical characteristic of the camera. In one embodiment, the physical characteristic of the camera determines an adjustment rate of the camera. In some examples, determining the predicted modified camera frame based at least in part on the physical characteristic of the camera may include dynamically detecting the physical characteristic of the camera. Additionally or alternatively, determining the predicted modified camera frame based at least in part on the physical characteristic of the camera may include identifying the physical characteristic of the camera based at least in part on previously received information about the camera. In some examples, determining the predicted modified camera frame may include determining the predicted modified camera frame based at least in part on a latency of a connection between the computing device and the additional computing device.

In some examples, displaying the predicted modified camera frame to the user may include displaying visual data received from the camera that is within a field of view of the camera but that is not within a previous camera frame displayed to the user. Additionally or alternatively, displaying the predicted modified camera frame to the user may include generating visual data based at least in part on visual data received from the camera and displaying the generated visual data within an area of the predicted modified camera frame that is outside a field of view of the camera and does not include data received from the camera.

In one embodiment, a system for implementing the above-described method may include several modules stored in memory, including (i) an input receiving module that receives, by a camera system that includes at least one camera, input from a user instructing the camera system to adjust framing of the camera, (ii) a direction module that directs, by the camera system, the camera to adjust its framing in accordance with the input from the user, (iii) a determination module that determines a predicted modified camera frame that approximates an actual modified camera frame predicted to result from directing the camera to adjust its framing in accordance with the input from the user, (iv) a display module that displays, before completely receiving visual data that results from the actual modified framing of the camera, the predicted modified camera frame to the user, (v) a data receiving module that receives the visual data including the actual modified camera frame from the camera after the camera adjusts its framing in accordance with the input from the user, (vi) the display module displays the actual modified camera frame to the user, and (vii) at least one physical processor that executes the input receiving module, the direction module, the determination module, the display module, and the data receiving module.

In some examples, the above-described method may be encoded as computer-readable instructions on a computer-readable medium. For example, a computer-readable medium may include one or more computer-executable instructions that, when executed by at least one processor of a computing device, may cause the computing device to (i) receive, by a camera system that includes at least one camera, input from a user instructing the camera system to adjust framing of the camera, (ii) direct, by the camera system, the camera to adjust the camera framing in accordance with the input from the user, (iii) determine a predicted modified camera frame that approximates an actual modified camera frame predicted to result from directing the camera to adjust the camera framing in accordance with the input from the user, (iv) display, before completely receiving visual data that results from the actual modified camera framing from the camera, the predicted modified camera frame to the user, (v) receive the visual data including the actual modified camera frame from the camera after the camera adjusts the camera framing in accordance with the input from the user, and (vi) display the actual modified camera frame to the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is an illustration of an exemplary physical camera.

Figure 1:
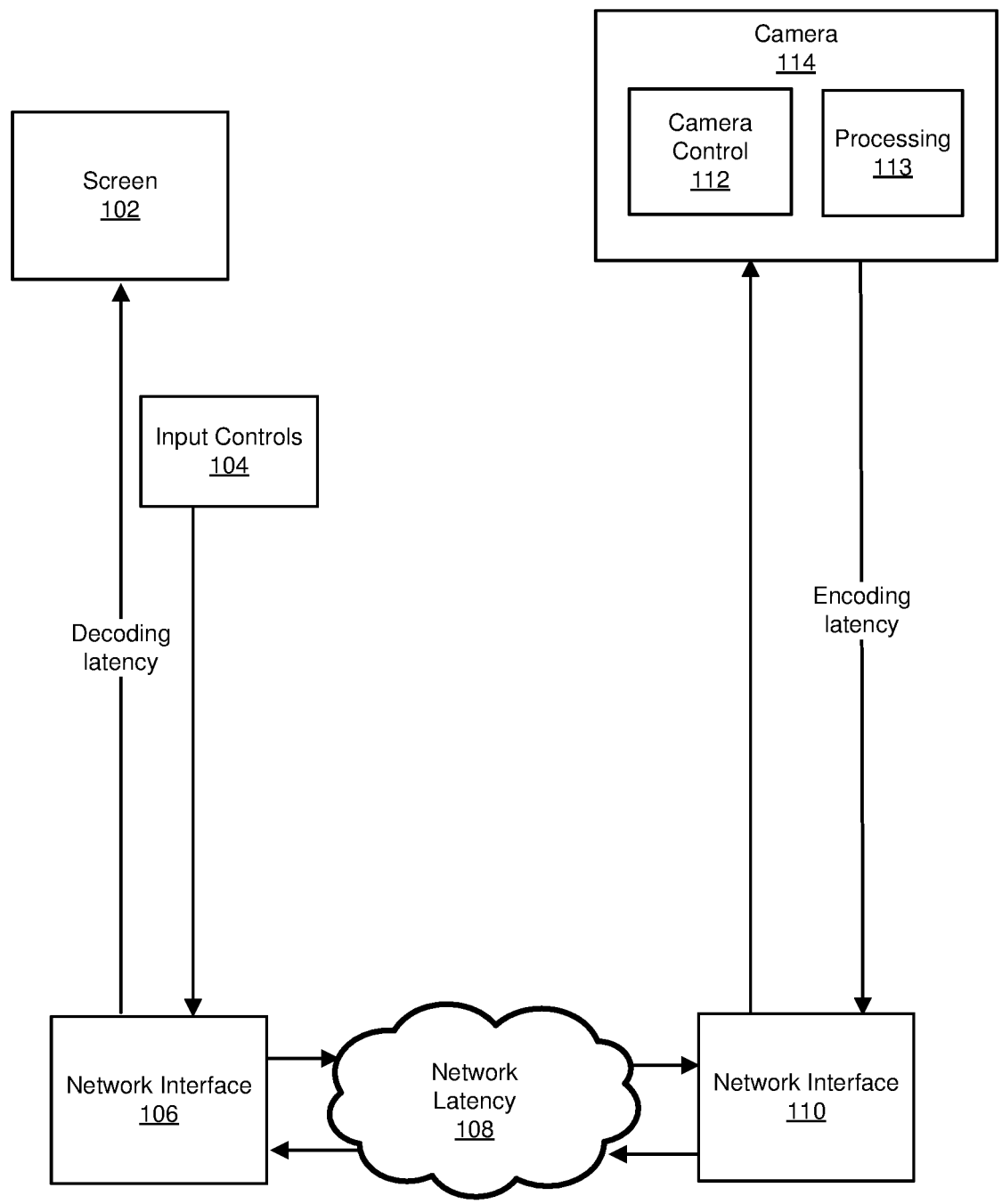
FIG. 1 is a block diagram of exemplary sources of latency in updating camera displays.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for updating camera displays. As will be explained in greater detail below, by predictively updating a visual display in response to user input without waiting for actual updated visual data, the systems and methods described herein may enable users to direct the camera system more accurately and efficiently by enabling users to immediately see the results of adjustments without intervening lag. In addition, the systems and methods described herein may improve the functioning of a computing device by improving the responsiveness of the computing device to user instructions. These systems and methods may also improve the fields of videoconferencing and/or video streaming by increasing the efficiency and accuracy with which a user is able to adjust a camera during videoconferencing and/or video streaming.

The following will provide, with reference to FIG. 1, a block diagram of example sources of latency in updating camera displays. Detailed descriptions of an example method for updating camera displays will be provided with reference to FIG. 2. In addition, detailed descriptions of example physical and virtual cameras will be provided in connection with FIGS. 3 and 4, respectively. Detailed descriptions of example camera frames will be provided in connection with FIGS. 5-9. Additionally, detailed descriptions of an example system for updating camera displays will be provided in connection with FIG. 10. Detailed descriptions of an exemplary graph of a camera display responding to user input will be provided in connection with FIG. 11

FIG. 1 is a block diagram of example sources of latency that may slow down the process of updating visual data in response to a user's input. In some examples, a user may view images and/or video on a screen 102 that are captured by a camera 114. The user may enter input into input controls 104 in order to adjust the camera framing, for example by panning, tilting, and/or zooming the camera. In some examples, network latency 108 may add a delay in between when the user enters the input and when camera 114 receives the input. Additionally or alternatively, encoding and/or decoding the message sent from input controls 104 to camera 114 may cause latency. Once the message reaches camera 114, camera control 112 may introduce additional lag as camera 114 may not actuate instantly upon receiving input and/or may take some time to accelerate the camera due to the physical inertia of the camera mass. In some examples, camera control 112 may drive a motor to physically move and/or zoom a lens of camera 114. Additionally or alternatively, camera control 112 may process the image inside the camera in concert with lens, sensor, and/or image processing 113. After camera 114 has adjusted as requested by the user, further delay may be introduced before the user can view the updated camera frame on screen 102. For example, encoding latency may add latency as the image and/or video data is encoded and/or compressed, network latency may affect the return trip of the data through network interface 108, and/or decoding latency may add latency as the image and/or video data is decoded and/or decompressed after being received from network interface 106. Finally, the user may see the updated camera frame on screen 102. Due to the numerous sources of latency, some users may overcorrect or under-correct when making adjustments to a camera frame. In some examples, a user may press a key to pan, zoom, and/or tilt a camera, wait for the updated camera frame to be displayed, and then repeat their action, slowly nudging the camera in the desired direction. By showing a predicted modified camera frame to a user immediately after a user directs the camera system to adjust the camera framing, the systems and methods described herein may improve the user experience of remotely controlling a camera in contexts such as videoconferences.

Figure 2:
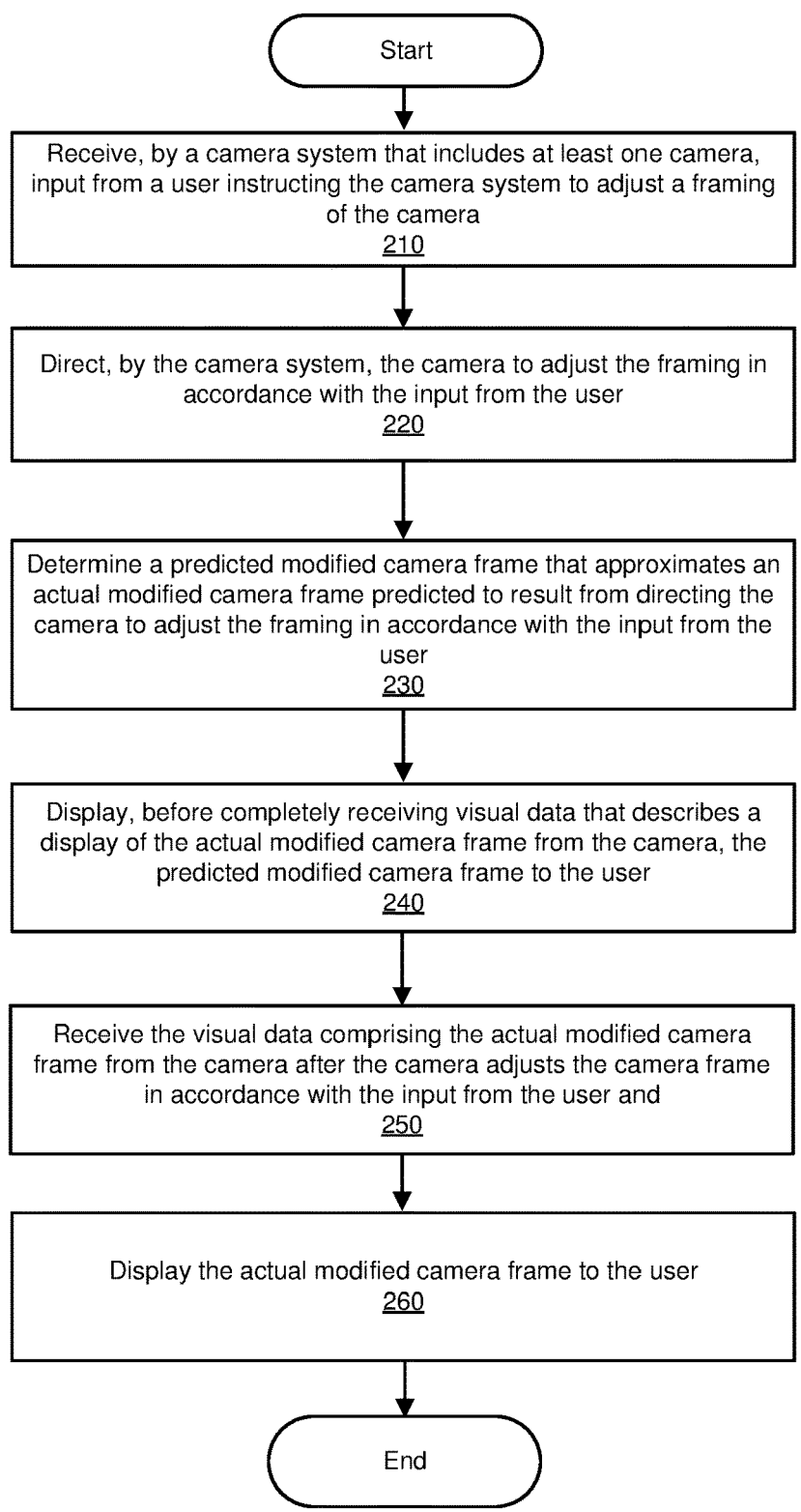
FIG. 2 is a flow diagram of an exemplary method for updating camera displays.

FIG. 2 is a flow diagram of an exemplary computer-implemented method 200 for updating camera displays. The steps shown in FIG. 2 may be performed by any suitable computer-executable code and/or computing system, including the system(s) illustrated in FIG. 10. In one example, each of the steps shown in FIG. 2 may represent an algorithm whose structure includes and/or is represented by multiple sub-steps, examples of which will be provided in greater detail below.

As illustrated in FIG. 2, at step 210, one or more of the systems described herein may receive, by a camera system that may include at least one camera, input from a user instructing the camera system to adjust a camera frame of the camera.

In some examples, the term "camera system," as used herein, may refer to a combination of hardware and/or software components that includes and/or directs a camera. In some embodiments, a camera system may control camera settings such as field of view, camera framing, and/or focus. In one embodiment, a camera system may include one or more visual displays that display information from the camera to one or more users. For example, a camera system may display information on the screen of a stationary computing device, the screen of a mobile computing device, a projector screen, and/or an augmented reality headset. In some embodiments, a camera system may include and/or communicate with one or more applications, including but not limited to a videoconferencing application, a video recording application, a social media application, and/or an augmented reality application. In some embodiments, a camera system may be distributed across multiple computing devices. For example, a camera system may enable a user of one computing device to control a camera associated with a second computing device.

In some examples, the term "camera," as used herein, may refer to a hardware component of a camera system that captures visual information. In some embodiments, a camera may capture still images. Additionally or alternatively, a camera may capture video. In some examples, a camera may have a field of view that encompasses everything visible to the camera. In one example, a camera (or a subsystem that processes input from the camera) may define a camera frame that encompasses everything currently being captured by the physical camera. In another example, the camera system may define a camera frame that encompasses a subset of the area captured by the camera hardware that is processed and/or saved by a camera application. Additionally or alternatively, a camera system may define a frame as the subset of the area captured by the camera that is displayed on a viewing screen. In some embodiments, a camera and/or camera system may have multiple camera frames.

The systems described herein may perform step 210 in a variety of ways. In one example, the systems described herein may receive input via a keyboard, mouse, and/or touch interface of a computing device. In some examples, the systems described herein may receive input via a different computing device than the computing device that is configured with the camera to which the input is directed. For example, the systems described herein may receive the input from the user via a computing device that displays visual data received from the camera to the user and may send, from the computing device, a message to an additional computing device that includes the camera and that is located remotely from the computing device.

In one embodiment, the camera system may include a videoconferencing system and the user may enter input into their own computing device to direct the camera on a computing device that is recording another participant in the videoconference. Additionally or alternatively, the camera system may include a video streaming system.

The input from the user instructing the camera system to adjust the camera framing may take a variety of forms. For example, the user may instruct the camera system to pan the camera frame, tilt the camera frame, and/or zoom the camera frame.

At step 220, one or more of the systems described herein may direct, by the camera system, the camera to adjust the camera framing in accordance with the input from the user.

The systems described herein may perform step 220 in a variety of ways. In one example, the systems described herein may send, from the computing device operated by the user, a message to an additional computing device that includes the camera and that is located remotely from the computing device. In some examples, the systems described herein may direct the camera to adjust the camera framing via a videoconferencing application that is designed to enable users to remotely direct cameras.

At step 230, one or more of the systems described herein may determine a predicted modified camera frame that approximates an actual modified camera frame predicted to result from directing the camera to adjust the camera framing in accordance with the input from the user.

The systems described herein may perform step 230 in a variety of ways. In one example, the systems described herein may determine the predicted modified camera frame by determining the predicted modified camera frame based at least in part on a physical characteristic of the camera. In one embodiment, the physical characteristic of the camera may determine an adjustment rate of the camera. For example, the physical characteristic of the camera may determine the movement latency of the camera (e.g., the lag between when an instruction is sent to the camera and when the camera begins to move), the movement speed of the camera, the acceleration/deceleration of the camera (e.g., the rate at which the camera changes speed). For example, the systems described herein may determine that, based on the motor that rotates the camera, the camera pans at a certain speed and/or pans by a certain amount every time the camera is instructed to pan. In another example, the systems described herein may determine that, based on the components that adjust the lenses to zoom a camera, the camera zooms at a certain speed and/or by a certain amount. In some examples, the systems described herein may then use the information about the movement rate of the camera to determine the delta between the camera frame prior to the movement and the camera frame that will result from the movement. For example, if the systems described herein determine that the camera pans 10° every time an instruction to pan is received, the systems described herein may calculate a predicted modified camera frame that will result if the camera pans 10°. In some embodiments, a camera may provide positional feedback (e.g., the actual angular position of the camera in space) and the systems described herein may use the positional feedback to determine the predicted modified camera frame.

In some embodiments, the camera may be physically integrated into a personal computing device such as a laptop or desktop. In other embodiments, the camera may be a physically separate part of a camera system that is networked to one or more computing devices. For example, FIG. 3 shows a camera 302 that is not physically integrated into a personal computing device. As illustrated in FIG. 3, the systems described herein may determine an adjustment rate of camera 302 based on a physical characteristic of camera 302. In one example, a user may direct the camera system to pan camera 302 from dog 306 to person 304. In this example, the systems described herein may use the physical characteristics of the camera to calculate a predicted modified camera frame that will result from camera 302 physically moving in accordance with the user's input.

In some examples, the systems described herein may determine the predicted modified camera frame based at least in part on the physical characteristic of the camera by dynamically detecting the physical characteristic of the camera. For example, the systems described herein may query the computing device that hosts the camera about the characteristic of the camera. In some embodiments, the systems described herein may query the computing device via the videoconferencing system, which may gather information about camera characteristics of computing systems on which the videoconferencing system is installed. Additionally or alternatively, the systems described herein may monitor the behavior of the camera to determine the physical characteristic of the camera. In some examples the systems described herein may monitor the behavior of the camera during live operation. Additionally or alternatively, the systems described herein may monitor the behavior of the camera during one or more calibration sessions. In one example, the systems described herein may observe that the camera pans 10° every time an instruction to pan is received and may determine that the camera has a physical characteristic that causes the camera to pan at that rate. In some embodiments, the systems described herein may report observed camera behavior and/or characteristics to a repository of camera behavior and/or characteristics to facilitate the retrieval of this information by other camera control systems.

Additionally or alternatively, the systems described herein may determine the predicted modified camera frame based at least in part on the physical characteristic of the camera by identifying the physical characteristic of the camera based at least in part on previously received information about the camera. For example, the systems described herein may receive input from a user that includes the name, manufacturer, and/or type of the camera. In this example, the systems described herein may retrieve information about characteristics of the camera based on the name, manufacturer, and/or type of the camera.

In some examples, the systems described herein may determine the predicted modified camera frame by determining the predicted modified camera frame based at least in part on a latency of a connection between the computing device and the additional computing device. For example, the systems described herein may determine the adjustment rate of the camera via observation but may be hampered by network latency. In one example, if a user presses "pan left" for three seconds, the camera may be warming up and/or accelerating to move for the duration of the first second of input and then may pan left for the remaining two seconds of input. In this example, the systems described herein may calculate the actuation latency for the camera by subtracting the network latency from the time between when the user presses "pan left" and the time when the camera begins to pan left. The systems described herein may calculate connection latency in a variety of ways. For example, the systems described herein may send a ping to the device that is configured with the camera and, time the round trip of the ping, and divide the round-trip time in half to determine the latency of the connection. Additionally or alternatively, the systems described herein may use timestamps and/or synchronized clocks.

Figure 4:
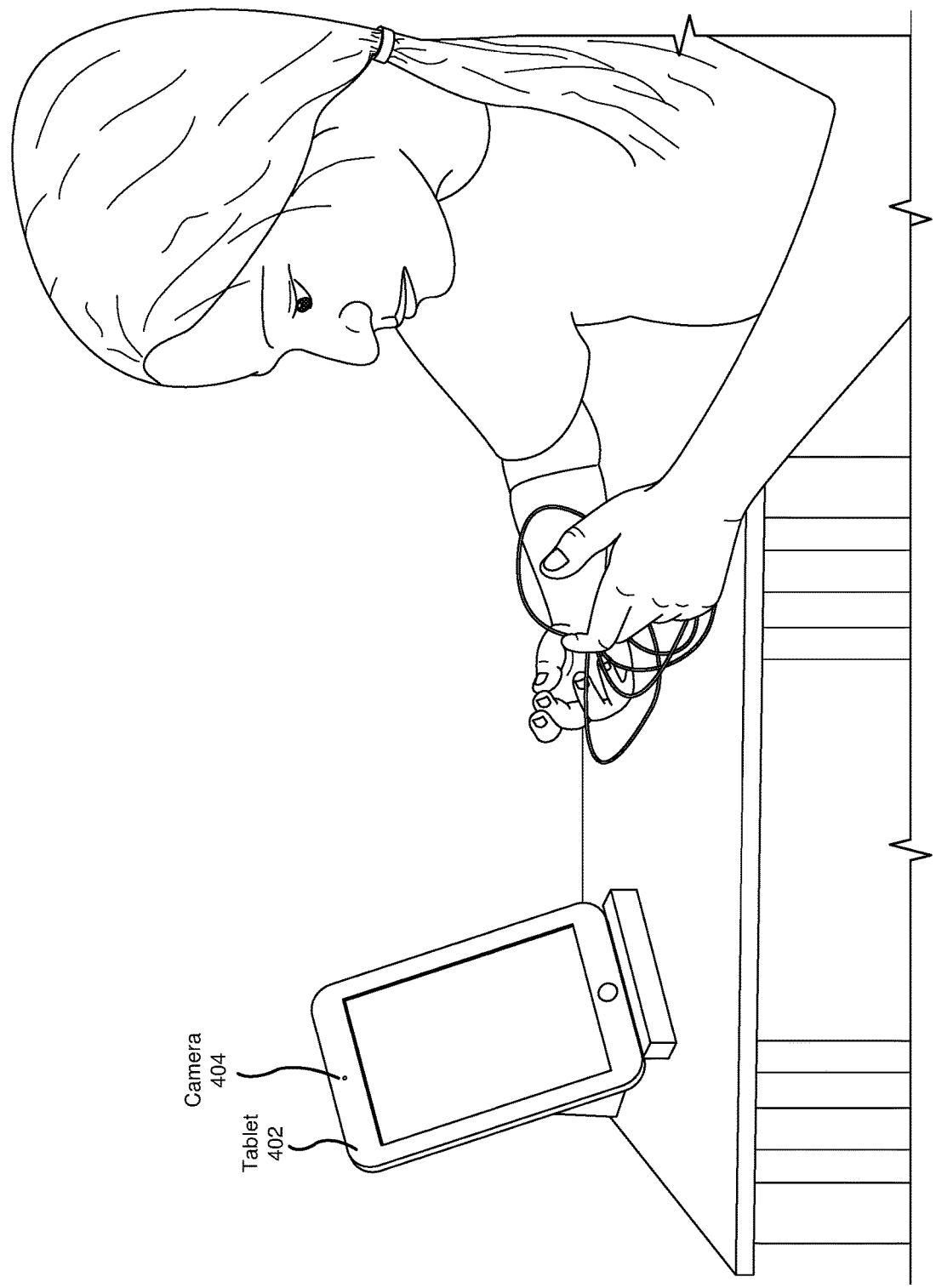
FIG. 4 is an illustration of an exemplary virtual camera.

Additionally or alternatively, the camera may include a virtual camera and the systems described herein may determine the predicted modified camera frame based on characteristics of the virtual camera. For example, as illustrated in FIG. 4, a tablet 402 may be equipped with a camera 404 that is not capable of physically moving independently of tablet 402. In this example, the camera system may adjust camera 402 by instructing a virtual camera to change which parts of the field of vision of camera 402 are within a virtual camera frame.

Returning to FIG. 2, at step 240, one or more of the systems described herein may display, before completely receiving visual data that results from the actual modified camera frame from the camera, the predicted modified camera frame to the user.

In some examples, term "visual data," as used herein, may refer to any data that describes a still and/or moving image. In some embodiments, the visual data may include video data. For example, the visual data may be streaming video. Additionally or alternatively, the visual data may include image data. For example, the visual data may be a picture taken by a camera.

The systems described herein may perform step 240 in a variety of ways. In some examples, the systems described herein may display the predicted modified camera frame to the user by displaying visual data received from the camera that is within a field of view of the camera but that is not within a previous camera frame displayed to the user. In some examples, the systems described herein may generate and display predicted visual data. Additionally or alternatively, the systems described herein may display data that is within the previous camera frame and within the predicted modified camera frame.

Figure 5:
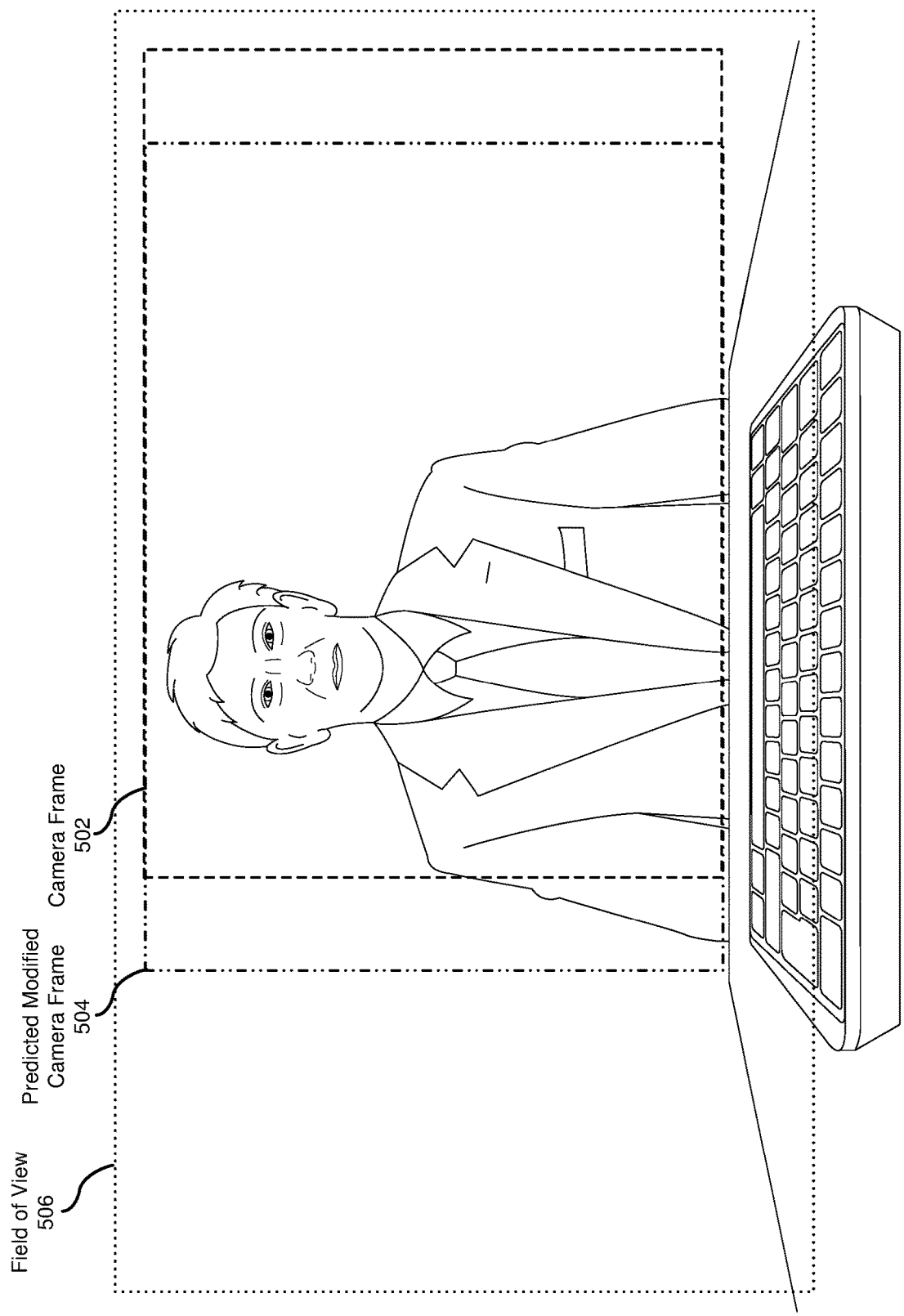
FIG. 5 is an illustration of an exemplary set of camera frames.

In some embodiments, the camera may have a field of view that is larger than the camera frame that is displayed to the user. For example, FIG. 5 illustrates a field of view 506 of a camera within a camera system. In some examples, the camera system may display camera frame 502 to a user and may not display visual data from outside of camera frame 502. In one example, a user may instruct the camera system to pan the camera frame to the left. In this example, the systems described herein may predict that panning the camera frame will result in predicted modified camera frame 504. In some examples, the systems described herein may be able to immediately display accurate visual data within predicted modified camera frame 504 because the systems described herein may already receive this visual data due to the visual data being within field of view 506.

Figure 6:
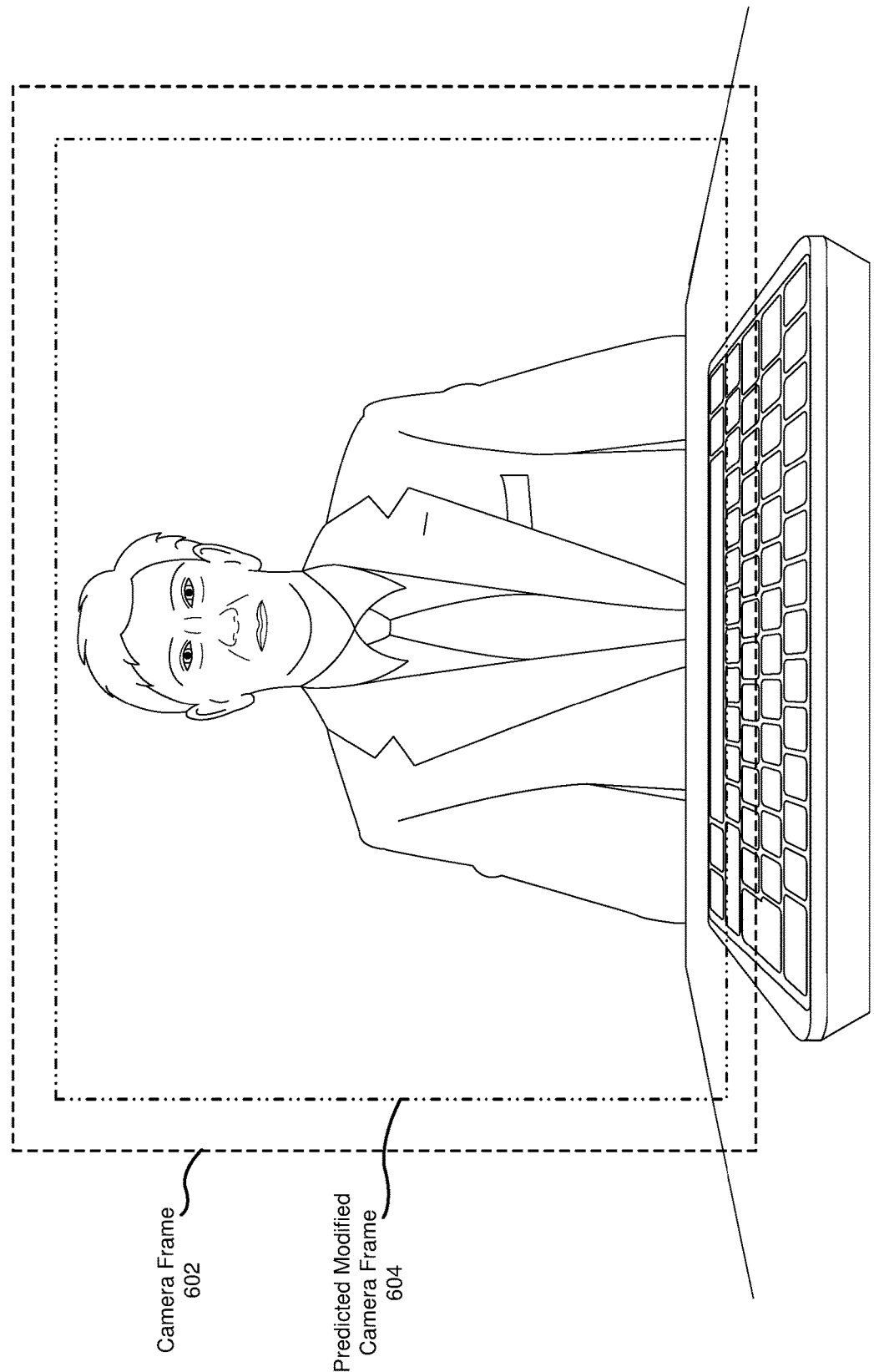
FIG. 6 is an illustration of an exemplary set of camera frames.

In some examples, the systems described herein may display visual data that is within both the previous camera frame and the predicted modified camera frame. For example, as illustrated in FIG. 6, a camera may have a camera frame 602 and a user may instruct the camera system to zoom in. In this example, predicted modified camera frame 604 is entirely within camera frame 602 and the systems described herein may display predicted modified camera frame 604 using data previously received and/or currently being received from the camera.

Figure 7:
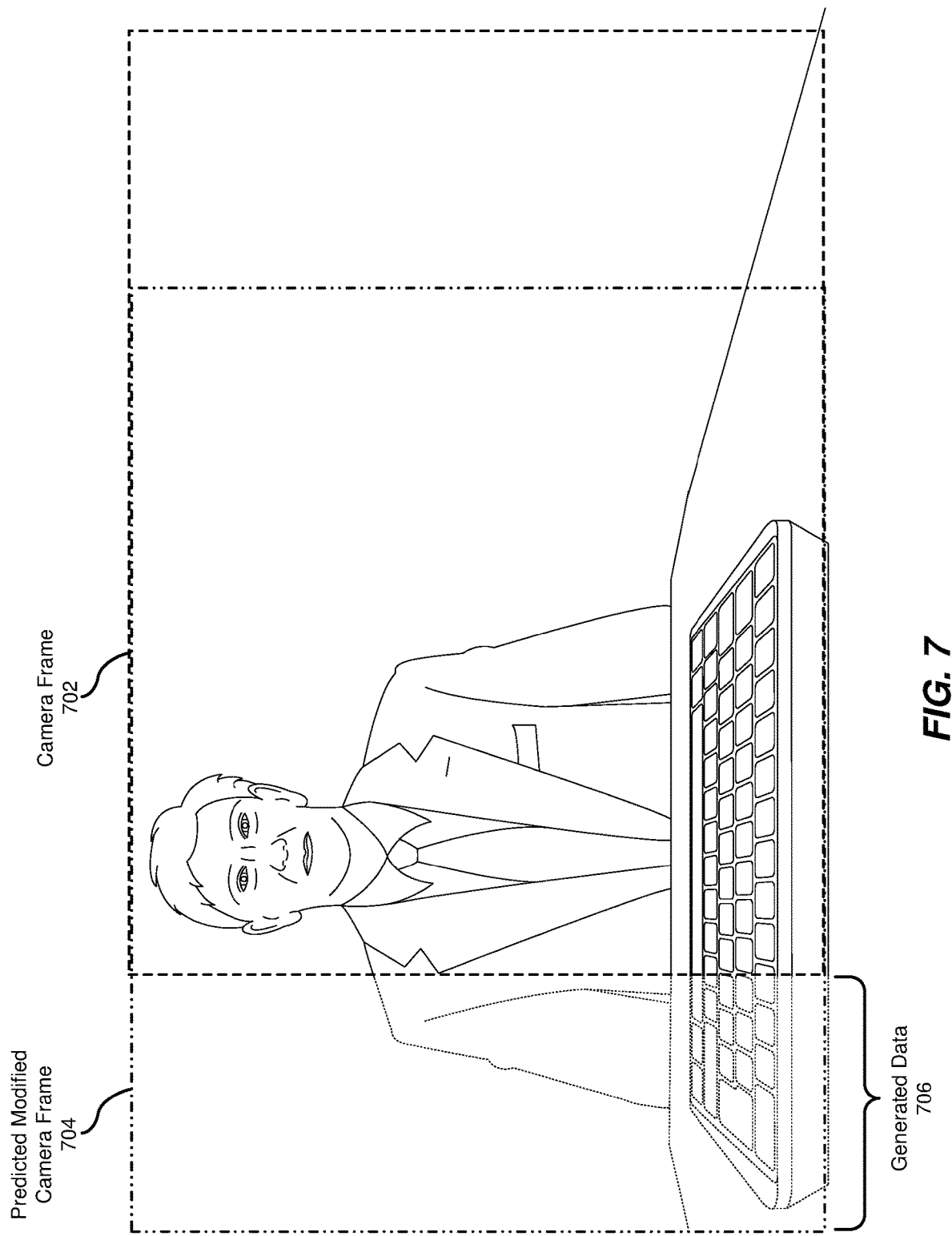
FIG. 7 is an illustration of an exemplary set of camera frames.

Additionally or alternatively, the systems described herein may display the predicted modified camera frame to the user by generating visual data based at least in part on visual data received from the camera and displaying the generated visual data within an area of the predicted modified camera frame that is outside a field of view of the camera and does not may include data received from the camera. For example, as illustrated in FIG. 7, a user may instruct a camera system to pan camera frame 702 to the left. In some embodiments, the camera system may not receive visual data outside of the camera frame from the camera and therefore may not have access to visual data for the entirety of predicted modified camera frame 704 until after receiving new visual data that includes the actual modified camera frame. In one embodiment, the camera system may use the visual data within camera frame 702 to create generated data 706 that includes predicted elements based on the elements within camera frame 702. Additionally or alternatively, the camera system may create generated data 706 based at least in part on previously received data. For example, if a user pans a camera to the left and then later pans the camera to the right, the systems described herein may use stored data from the camera's previous position to create generated data 706. In some embodiments, the systems described herein may display the most recent imagery observed at the specified position. Additionally or alternatively, the systems described herein may display an average of a predetermined number of the most recent frames observed (e.g., the most recent ten frames, twenty frames, or thirty frames), use an algorithm to predict, based on a combination of what we previously observed when the camera was at the specified position and is currently visible to the camera, probably visual data within the predicted modified camera frame, and/or display filler data such as color gradients based on previous visual data from the area within the predicted modified camera frame. In some examples, the systems described herein may represent the predicted imagery differently (e.g., grayscale, blurred, and/or dimmed) to distinguish the predicted visual data from actual visual data.

Figure 8:
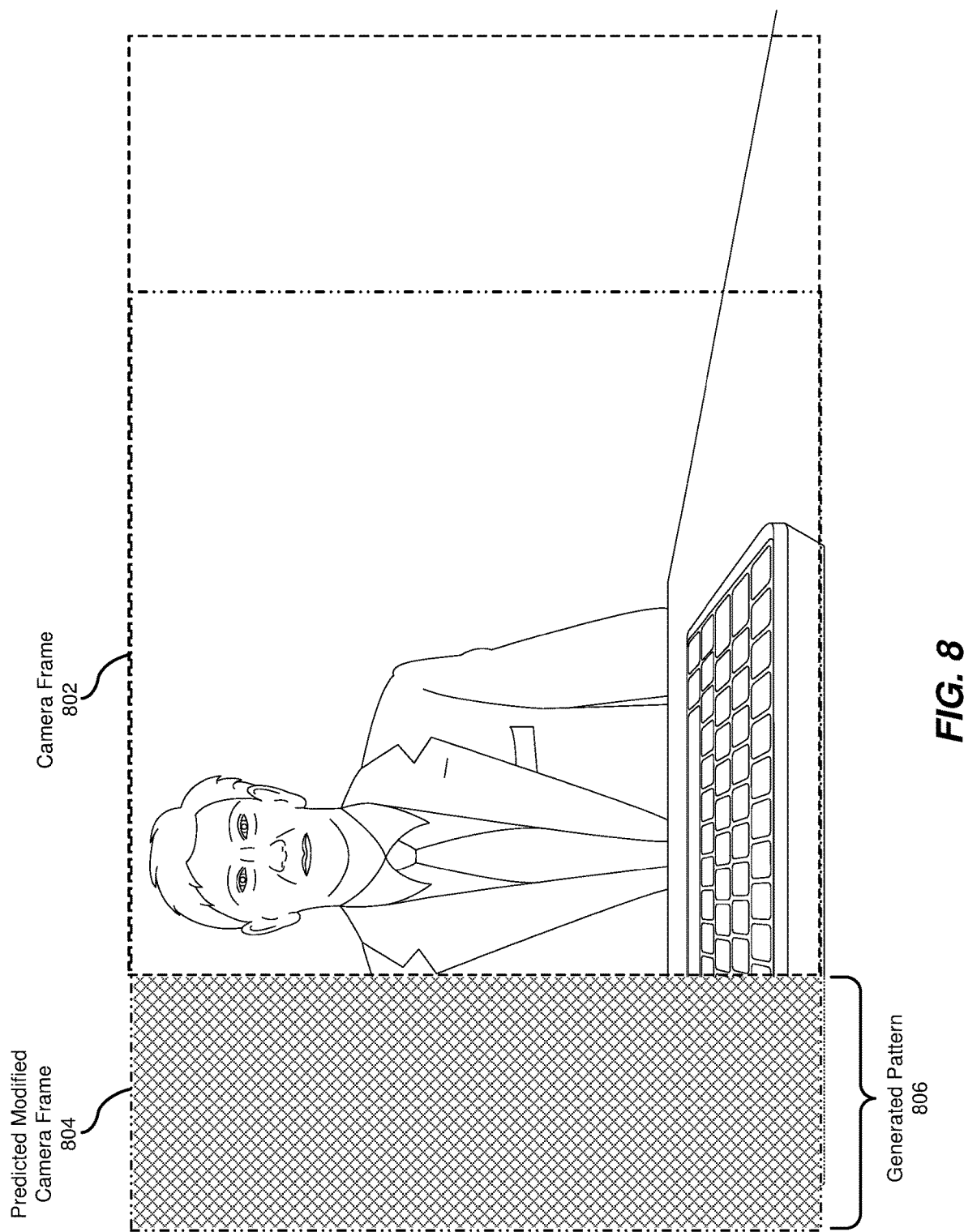
FIG. 8 is an illustration of an exemplary set of camera frames.

In some embodiments, the camera system may generate filler data to display in areas of the predicted modified camera frame that are outside the previous camera frame. For example, as illustrated in FIG. 8, a user may instruct a camera system to pan a camera frame 802 to the left. In this example, the systems described herein may not have information about what is outside the camera frame and may generate filler data such as generated pattern 806 to display in predicted modified camera frame 804 until receiving updated visual data. In some embodiments, generated pattern 806 may be generated based in part on visual data within camera frame 802. For example, generated pattern 806 may use colors that are common within the visual data within camera frame 802. In other embodiments, generated pattern 806 may be arbitrary and/or may be a preset pattern that does not vary based on received visual data.

Returning to FIG. 2, at step 250, one or more of the systems described herein may receive the visual data including the actual modified camera frame from the camera after the camera adjusts the camera frame in accordance with the input from the user.

The systems described herein may perform step 250 in a variety of ways and/or contexts. In one embodiment, the systems described herein may receive the updated visual data via a videoconferencing application. Additionally or alternatively, the systems described herein may receive the updated visual data via a camera application.

At step 260, one or more of the systems described herein may display the actual modified camera frame to the user.

The systems described herein may perform step 260 in a variety of ways. In one example, the systems described herein may immediately display the actual modified camera frame regardless of the accuracy of the predicted modified camera frame.

Figure 9:
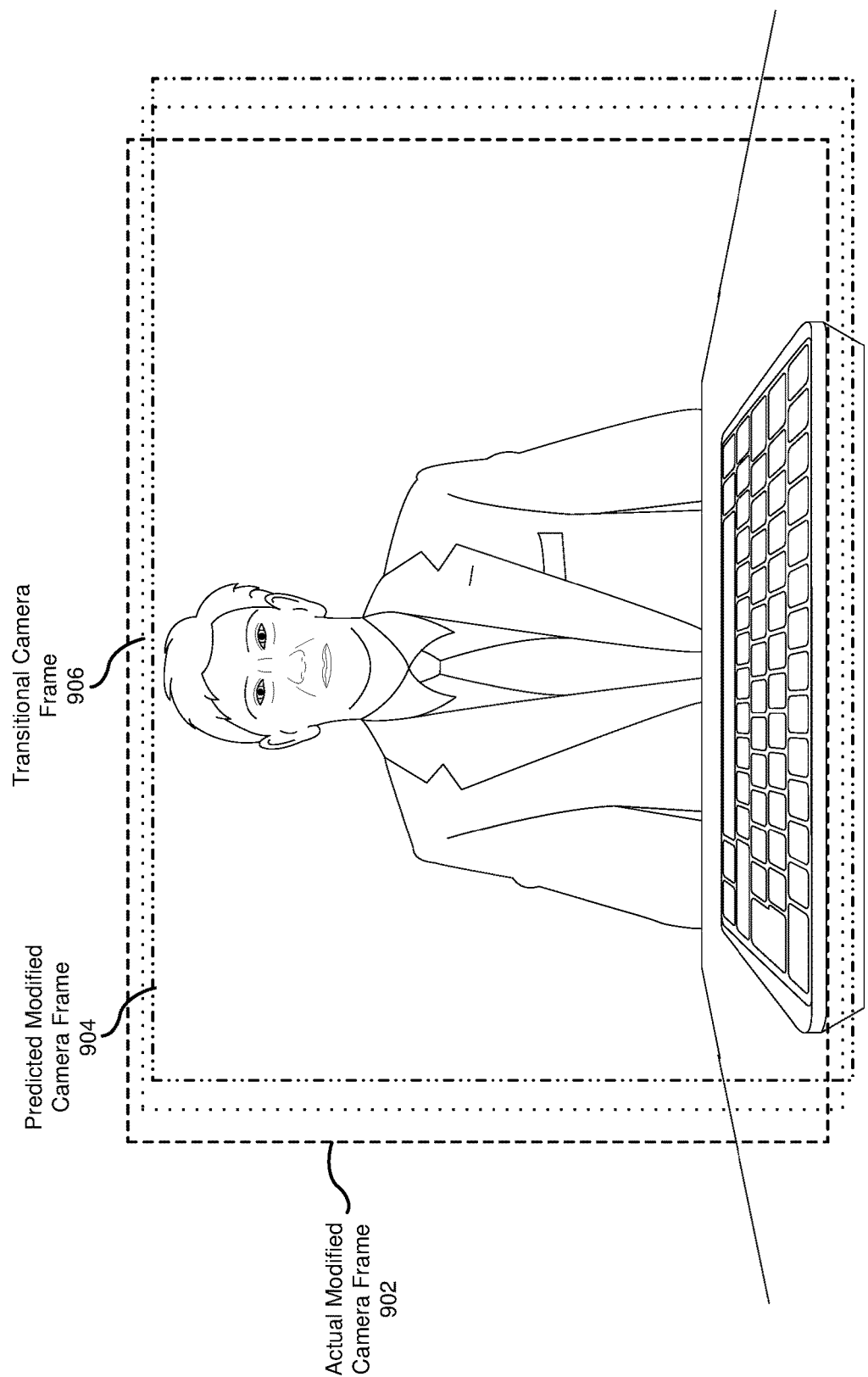
FIG. 9 is an illustration of an exemplary set of camera frames.
Figure 10:
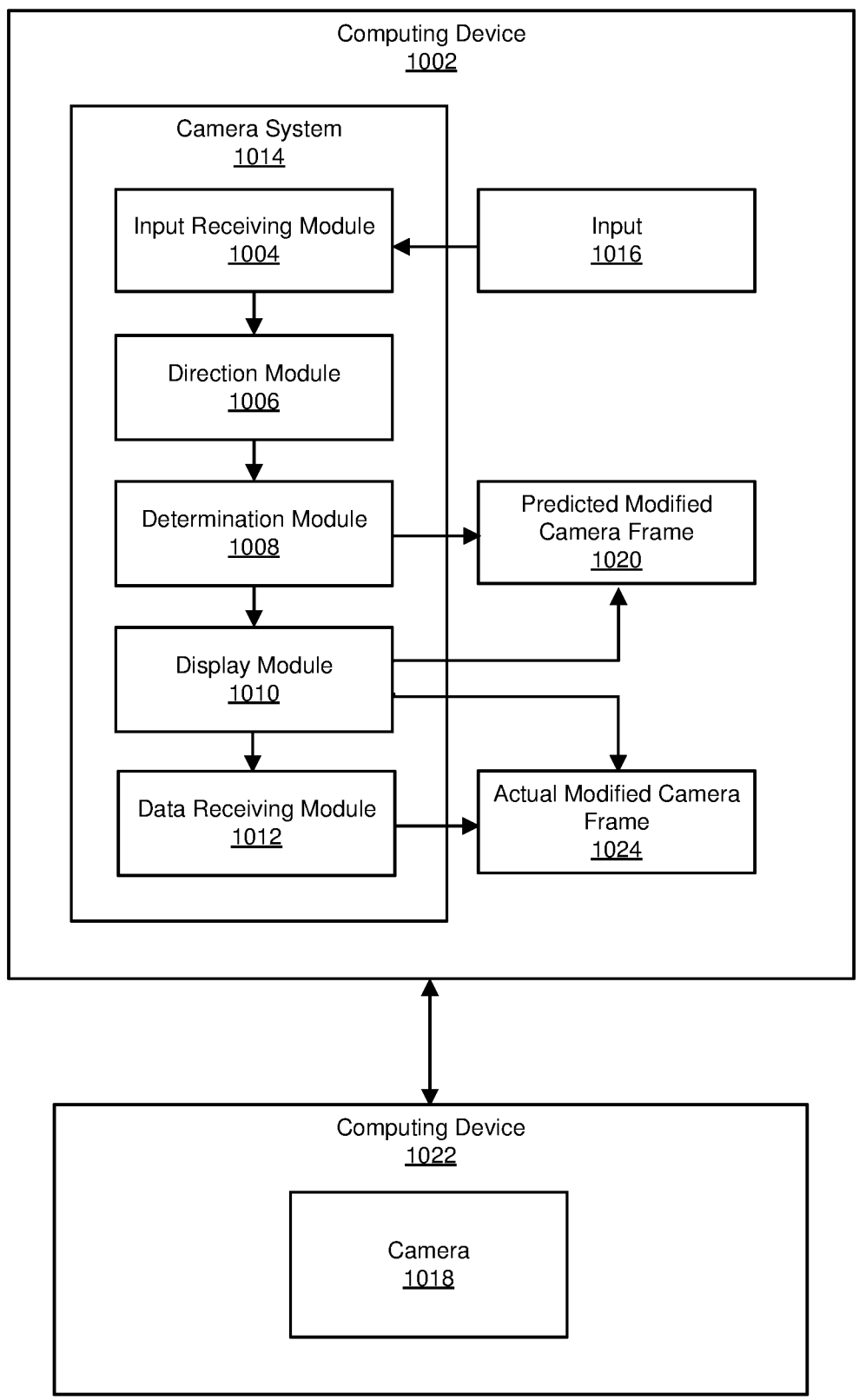
FIG. 10 is an illustration of an exemplary system for updating camera displays.

In other examples, the systems described herein may smoothly transition between the predicted modified camera frame and the actual modified camera frame by inserting one or more transitional camera frames. For example, as illustrated in FIG. 9, the systems described herein may calculate a predicted modified camera frame 904 after receiving instructions from a user to adjust the camera frame. In one example, an actual modified camera frame 902 may be visibly different from predicted modified camera frame 904. For example, the prediction model used to calculate predicted modified camera frame 902 may be inaccurate (e.g., due to insufficient data about the camera). In some embodiments, upon receiving the visual data that describes actual modified camera frame 902, the systems described herein may calculate one or more transitional camera frames, such as transitional camera frame 906, that are between predicted modified camera frame 904 and actual modified camera frame 902. In some examples, the systems described herein may briefly display transitional camera frame 906 before displaying actual modified camera frame 902 in order to prevent the display from appearing jittery or uneven.

In some embodiments, the systems described herein may be represented by a set of modules stored in memory on one or more computing devices. For example, a computing device 1002 may be configured with a camera system 1014 and may communicate with a computing device 1022 that is equipped with a camera 1018. Computing device 1002 may communicate with computing device 1022 in a variety of ways. In one embodiment, computing device 1002 may communicate with computing device 1022 via a local area network. Additionally or alternatively, computing device 1002 may communicate with computing device 1022 via the Internet.

In one embodiment, computing device 1002 may be configured various modules that perform various functions, such as input receiving module 1004, direction module 1006, determination module 1008, display module 1010, and/or data receiving module 1012. In some examples, input receiving module 1004 may receive, by camera system 1014, input 1016 from a user instructing camera system 1014 to adjust the camera frame of the camera 1018. Next, direction module 1006 may direct camera 1016 to adjust the camera frame in accordance with the input 1016. Before, afterwards, or at the same time, determination module 1008 may determine a predicted modified camera frame 1020 that approximates an actual modified camera frame 1024 predicted to result from directing camera 1018 to adjust the camera frame in accordance with the input 1016. Next, display module 1010 may display, before completely receiving visual data that results from the actual modified camera frame 1024 from camera 1018, predicted modified camera frame 1020 to the user. Shortly thereafter (e.g., within milliseconds, seconds, or minutes), data receiving module 1004 may receive the visual data that includes actual modified camera frame 1024 from camera 1018 after camera 1018 adjusts the camera frame in accordance with input 1016. Finally, display module 1010 may display actual modified camera frame 1024 to the user.

Figure 11:
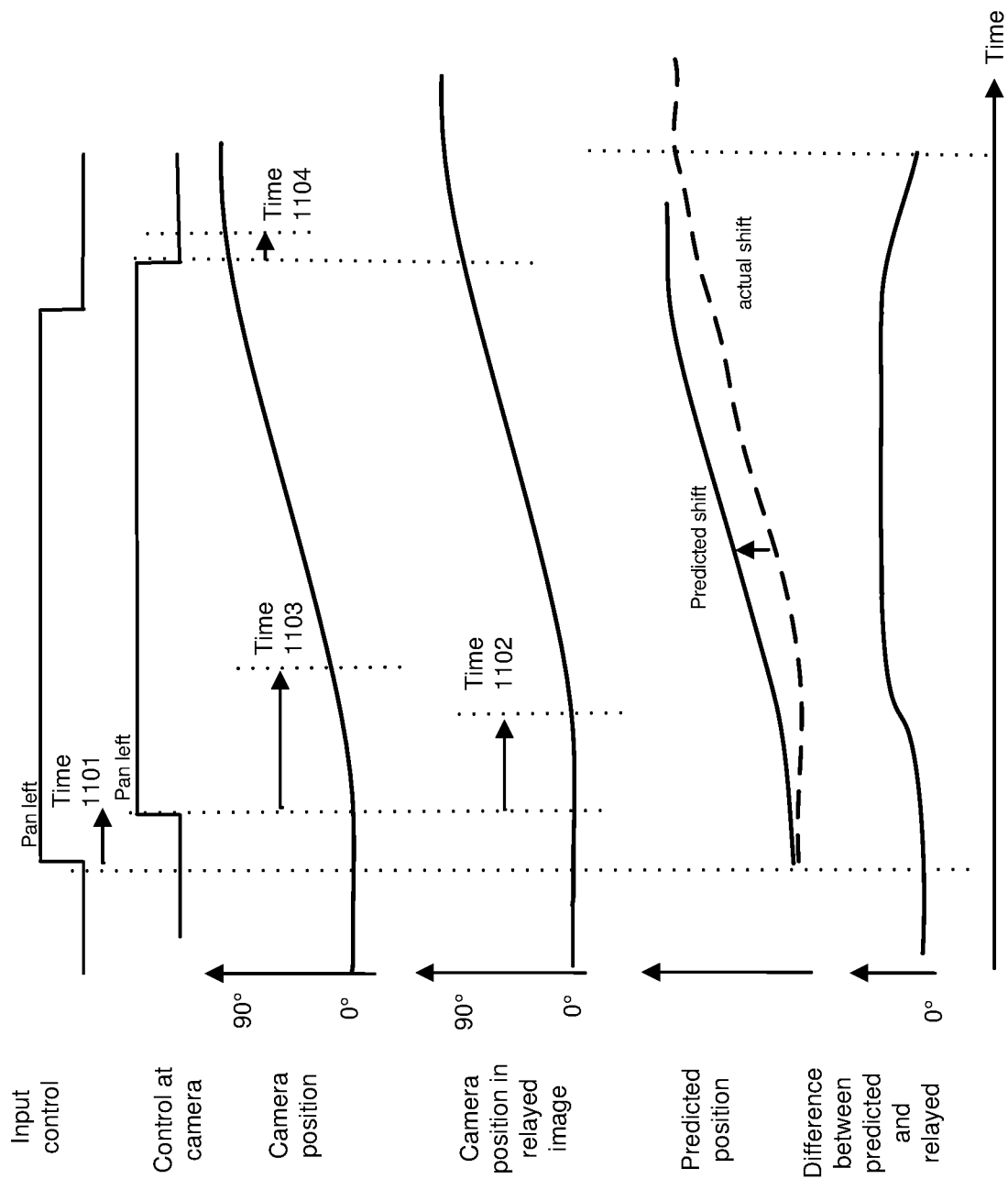
FIG. 11 is an illustration of an exemplary graph of a camera display responding to user input.

As explained in more detail above, in some embodiments, the systems described herein may provide a user with immediate visual feedback despite multiple sources of delay in receiving an actual updated image from the camera. FIG. 11 is an example graph of the times at which various actions may happen within a camera system that is responding to user input. At time 1101, a camera system may receive input from a user instructing the camera to pan left. At time 1102, the systems described herein may display a predicted camera frame based on the user's input. Meanwhile, at time 1103, the camera may finish accelerating and begin to move at full speed to fulfill the user's request. At time 1104, the camera may finish decelerating and the actual camera frame may reach the position specified by the user input. Between time 1102 and time 1104, the systems described herein may display the predicted camera frame to the user, providing the user with immediate visual feedback despite the actual camera frame not yet having been updated.

As explained above in connection with method 200, the systems and methods described herein may provide users with immediate feedback when users instruct camera systems to adjust camera framing. Users sometimes pan, tilt, or zoom cameras remotely during videoconferences. Unfortunately, there may be significant delay between a user sending the command to modify the camera view and the updated camera view being displayed to the user, due to mechanical delays in the camera response time and/or due to network latency that delays the receipt of commands by the camera and the receipt of the updated camera view by the user. By predicting the modified camera view and updating the camera view displayed to the user to the modified camera view as soon as the user sends input to move the camera, an enhanced videoconferencing system may improve a user's ability to achieve their desired camera view and thus improve the user's overall videoconferencing experience.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, In some embodiments, the term "memory device" may refer to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, In some embodiments, the term "physical processor" may refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive visual data to be transformed, transform the visual data into a form suitable for display to a user and/or a form suitable for performing calculations, output a result of the transformation to display images and/or video to a user, use the result of the transformation to predict a modified camera frame, and store the result of the transformation to preserve data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, In some embodiments, the term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, In some embodiments, the terms "connected to" and "coupled to" (and their derivatives), as used in the specification and claims, are to be construed as permitting both direct and indirect (i.e., via other elements or components) connection. In addition, In some embodiments, the terms "a" or "an," as used in the specification and claims, are to be construed as meaning "at least one of." Finally, for ease of use, In some embodiments, the terms "including" and "having" (and their derivatives), as used in the specification and claims, are interchangeable with and have the same meaning as the word "comprising."

What is claimed is:

1. A computer-implemented method comprising:
   receiving, by a camera system comprising at least one camera that captures video and at least one camera display that displays visual data received from the at least one camera, input from a user instructing the camera system to adjust a framing of the camera, wherein image data that is within the framing of the camera is displayed to the user and image data that is outside the framing of the camera is not displayed to the user;

directing, by the camera system, the camera to adjust the framing in accordance with the input from the user;

determining, before completely receiving visual data that results from an actual modified camera frame from the camera and based at least in part on a latency of a connection between the at least one camera and the camera display, predicted visual data that enables the camera display to display an approximation of the actual modified camera frame predicted to result from adjusting the framing of the camera in accordance with the input from the user;

providing, before completely receiving the visual data that results from the actual modified camera frame, the predicted visual data to the camera display;

displaying, by the camera display and before completely receiving visual data that results from the actual modified camera frame from the camera, the predicted visual data to the user, thereby providing the user with immediate visual feedback on adjusting the framing of the camera;

completely receiving the visual data comprising the actual modified camera frame from the camera after the camera adjusts the framing in accordance with the input from the user;

providing the visual data comprising the actual modified camera frame to the camera display; and displaying, by the camera display, the actual modified camera frame to the user.

2. The computer-implemented method of claim 1, wherein:

receiving the input from the user comprises receiving the input from the user via a computing device that displays visual data received from the camera to the user; and directing the camera to adjust the framing comprises sending, from the computing device, a message to an additional computing device that comprises the camera and that is located remotely from the computing device.

3. The computer-implemented method of claim 1, wherein determining the predicted modified camera frame comprises determining the predicted modified camera frame based at least in part on a physical characteristic of the camera.

4. The computer-implemented method of claim 3, wherein the physical characteristic of the camera determines an adjustment rate of the camera.

5. The computer-implemented method of claim 3, wherein determining the predicted modified camera frame based at least in part on the physical characteristic of the camera comprises dynamically detecting the physical characteristic of the camera.

6. The computer-implemented method of claim 3, wherein determining the predicted modified camera frame based at least in part on the physical characteristic of the camera comprises identifying the physical characteristic of the camera based at least in part on previously received information about the camera.

7. The computer-implemented method of claim 1, wherein displaying the predicted modified camera frame to the user comprises displaying visual data received from the camera that is within a field of view of the camera but that is not within a previous camera frame displayed to the user.

8. The computer-implemented method of claim 1, wherein displaying the predicted modified camera frame to the user comprises:

generating visual data based at least in part on visual data received from the camera; and displaying the generated visual data within an area of the predicted modified camera frame that is outside a field of view of the camera and does not comprise data received from the camera.

9. The computer-implemented method of claim 1, wherein the visual data comprises video data.

10. The computer-implemented method of claim 1, wherein the camera system comprises a videoconferencing system.

11. A system for updating camera displays, the system comprising:

an input receiving module, stored in memory, that receives, by a camera system comprising at least one camera that captures video and at least one camera display that displays visual data received from the at least one camera, input from a user instructing the camera system to adjust a framing of the camera, wherein image data that is within the framing of the camera is displayed to the user and image data that is outside the framing of the camera is not displayed to the user;

a direction module, stored in memory, that directs, by the camera system, the camera to adjust the framing in accordance with the input from the user;

a determination module, stored in memory, that:

determines, before completely receiving visual data that results from an actual modified camera frame from the camera and based at least in part on a latency of a connection between the at least one camera and the camera display, predicted visual data that enables the camera display to display an approximation of the actual modified camera frame predicted to result from adjusting the framing of the camera in accordance with the input from the user; and provides, before the camera display completely receives the visual data that results from the actual modified camera frame, the predicted visual data to the camera display a display module, stored in memory, that displays, by the camera display and before completely receiving visual data that results from the actual modified camera frame from the camera, the predicted visual data to the user, thereby providing the user with immediate visual feedback on adjusting the framing of the camera;

a data receiving module, stored in memory, that:

completely receives the visual data comprising the actual modified camera frame from the camera after the camera adjusts the framing in accordance with the input from the user; and provides the visual data comprising the actual modified camera frame to the camera display;

the display module displays, by the camera display, the actual modified camera frame to the user; and at least one physical processor that executes the input receiving module, the direction module, the determination module, the display module, and the data receiving module.

12. The system of claim 11, wherein:

the input receiving module receives the input from the user by receiving the input from the user via a computing device that displays visual data received from the camera to the user; and the direction module directs the camera to adjust the framing by sending, from the computing device, a message to an additional computing device that comprises the camera and that is located remotely from the computing device.

13. The system of claim 11, wherein the determination module determines the predicted modified camera frame by determining the predicted modified camera frame based at least in part on a physical characteristic of the camera.

14. The system of claim 13, wherein the physical characteristic of the camera determines an adjustment rate of the camera.

15. The system of claim 13, wherein the determination module determines the predicted modified camera frame based at least in part on the physical characteristic of the camera by dynamically detecting the physical characteristic of the camera.

16. The system of claim 13, wherein the determination module determines the predicted modified camera frame based at least in part on the physical characteristic of the camera by identifying the physical characteristic of the camera based at least in part on previously received information about the camera.

17. The system of claim 11, wherein the display module displays the predicted modified camera frame to the user by displaying visual data received from the camera that is within a field of view of the camera but that is not within a previous camera frame displayed to the user.

18. The system of claim 11, wherein the display module displays the predicted modified camera frame to the user by:
generating visual data based at least in part on visual data received from the camera; and
displaying the generated visual data within an area of the predicted modified camera frame that is outside a field of view of the camera and does not comprise data received from the camera.

19. A computer-readable medium comprising:
receives, by a camera system comprising at least one camera that captures video and at least one camera display that displays visual data received from the at least one camera, input from a user instructing the camera system to adjust a framing of the camera, wherein image data that is within the framing of the camera is displayed to the user and image data that is outside the framing of the camera is not displayed to the user;
directs, by the camera system, the camera to adjust the framing in accordance with the input from the user;
determines, before completely receiving visual data that results from an actual modified camera frame from the camera and based at least in part on a latency of a connection between the at least one camera and the camera display, predicted visual data that enables approxi mates the actual modified camera frame predicted to result from adjusting the framing of the camera in accordance with the input from the user;
provides, before completely receiving the visual data that results from the actual modified camera frame, the predicted visual data to the camera display;
displays, by the camera display and before completely receiving visual data that results from the actual modified camera frame from the camera, the predicted visual data to the user, thereby providing the user with immediate visual feedback on adjusting the framing of the camera;
completely receives the visual data comprising the actual modified camera frame from the camera after the camera adjusts the framing in accordance with the input from the user;
provides the visual data comprising the actual modified camera frame to the camera display; and
displays, by the camera display, the actual modified camera frame to the user.

* * * * *

UNITED STATES PATENT AND TRADEMARK OFFICE
CERTIFICATE OF CORRECTION

PATENT NO. : 10,965,873 B1
APPLICATION NO. : 16/139532
DATED : March 30, 2021
INVENTOR(S) : Howard William Winter Page 1 of 1

It is certified that error appears in the above-identified patent and that said Letters Patent is hereby corrected as shown below:

In the Claims

Claim 19, Column 16, Line 18 should read:
approximates the actual modified camera frame Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*